(12) United States Patent
Kurioka

(10) Patent No.: US 12,090,817 B2
(45) Date of Patent: Sep. 17, 2024

(54) WINDOWSHIELD ATTACHMENT STRUCTURE AND BRACKET

(71) Applicant: Kawasaki Motors, Ltd., Hyogo (JP)

(72) Inventor: Hiromasa Kurioka, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 307 days.

(21) Appl. No.: 17/749,230

(22) Filed: May 20, 2022

(65) Prior Publication Data

US 2023/0373275 A1 Nov. 23, 2023

(51) Int. Cl.
*B60J 1/00* (2006.01)
*B60J 1/02* (2006.01)
*B60J 1/18* (2006.01)

(52) U.S. Cl.
CPC .......... *B60J 1/004* (2013.01); *B60J 1/00* (2013.01); *B60J 1/006* (2013.01); *B60J 1/02* (2013.01); *B60J 1/025* (2013.01); *B60J 1/18* (2013.01)

(58) Field of Classification Search
CPC ......... B60J 1/00; B60J 1/02; B60J 1/18; B60J 1/025; B60J 1/004; B60J 1/006
USPC .............................. 296/96.21, 84.1, 90, 77.1
See application file for complete search history.

(56) References Cited

U.S. PATENT DOCUMENTS

| 8,936,296 B1 * | 1/2015 | Fedders | B60J 1/06 296/85 |
| 2018/0273106 A1 * | 9/2018 | Ikeda | B62D 25/04 |

* cited by examiner

*Primary Examiner* — Amy R Weisberg
*Assistant Examiner* — Dana D Ivey
(74) *Attorney, Agent, or Firm* — XSENSUS LLP

(57) ABSTRACT

A windowshield attachment structure includes a windowshield defining the front or rear of a vehicle compartment of an off-road vehicle, a pillar arranged inward of the vehicle compartment with respect to the windowshield in a front-rear direction, a door defining a side of the vehicle compartment, and a bracket attached to the windowshield and fixing the windowshield to the pillar. The pillar has a seal surface facing outward of the vehicle compartment. The door has a seal contacting the seal surface in a closed state. The bracket extends from the windowshield to the seal surface along a surface of the pillar on the side opposite to the windowshield. A tip end portion of the bracket is arranged on the seal surface. An upper edge of the tip end portion is inclined with respect to the horizontal direction so as to be positioned downward toward the windowshield.

10 Claims, 6 Drawing Sheets

US 12,090,817 B2

WINDOWSHIELD ATTACHMENT STRUCTURE AND BRACKET

FIELD

The technique disclosed herein relates to a windowshield attachment structure and a bracket.

BACKGROUND

Patent Document 1 (U.S. Patent Application Publication No. 2018/273106) discloses a vehicle including a front pillar and a windowshield. The windowshield is attached to the front pillar with an adhesive.

SUMMARY

The above-described windowshield needs to be held until the adhesive is cured after the windowshield has been bonded to the pillar with the adhesive. For this reason, it takes time and effort to attach the windowshield. Moreover, the windowshield is attached to the pillar only with the adhesive, and for this reason, it is difficult to firmly attach the windowshield to the pillar.

The technique disclosed herein has been made in view of the above-described points, and an object of the technique is to easily and firmly attach a windowshield to a pillar.

The windowshield attachment structure disclosed herein includes a windowshield defining the front or rear of a vehicle compartment of an off-road vehicle, a pillar arranged inward of the vehicle compartment with respect to the windowshield in a front-rear direction of the off-road vehicle, a door defining a side of the vehicle compartment and opening or closing the vehicle compartment, and a bracket attached to the windowshield and fixing the windowshield to the pillar. The pillar has a seal surface facing outward of the vehicle compartment. The door has a seal contacting the seal surface in a closed state. The bracket extends from the windowshield to the seal surface along a surface of the pillar on the side opposite to the windowshield. A tip end portion of the bracket is arranged on the seal surface. An upper edge of the tip end portion is inclined with respect to the horizontal direction so as to be positioned downward toward the windowshield.

The bracket disclosed herein is a bracket for attaching a windowshield defining the front or rear of a vehicle compartment of an off-rod vehicle to a pillar arranged inward of the vehicle compartment with respect to the windowshield in a front-rear direction of the off-road vehicle. The bracket includes an attachment portion attached to the windowshield and a holding portion extending in a hook shape from the attachment portion along a surface of the pillar on the side opposite to the windowshield. The holding portion includes a tip end portion arranged on a surface of the pillar facing outward of the vehicle compartment. An upper edge of the tip end portion is inclined with respect to the horizontal direction so as to be positioned downward toward an outside of the vehicle compartment.

The windowshield attachment structure disclosed herein includes a windowshield defining the front or rear of a vehicle compartment of an off-road vehicle, a pillar arranged inward of the vehicle compartment with respect to the windowshield in a front-rear direction of the off-road vehicle, a door defining a side of the vehicle compartment and opening or closing the vehicle compartment, and a bracket attached to the windowshield and fixing the windowshield to the pillar. The pillar has a seal surface facing outward of the vehicle compartment. The door has a seal contacting the seal surface in a closed state. The bracket extends from the windowshield to the seal surface along a surface of the pillar on the side opposite to the windowshield. A tip end portion of the bracket is arranged on the seal surface. The pillar is formed of a deformed pipe.

According to the above-described windowshield attachment structure, the windowshield can be easily and firmly attached to the pillar.

According to the above-described bracket, the windowshield can be easily and firmly attached to the pillar.

DESCRIPTION OF EMBODIMENTS

Figure 1:
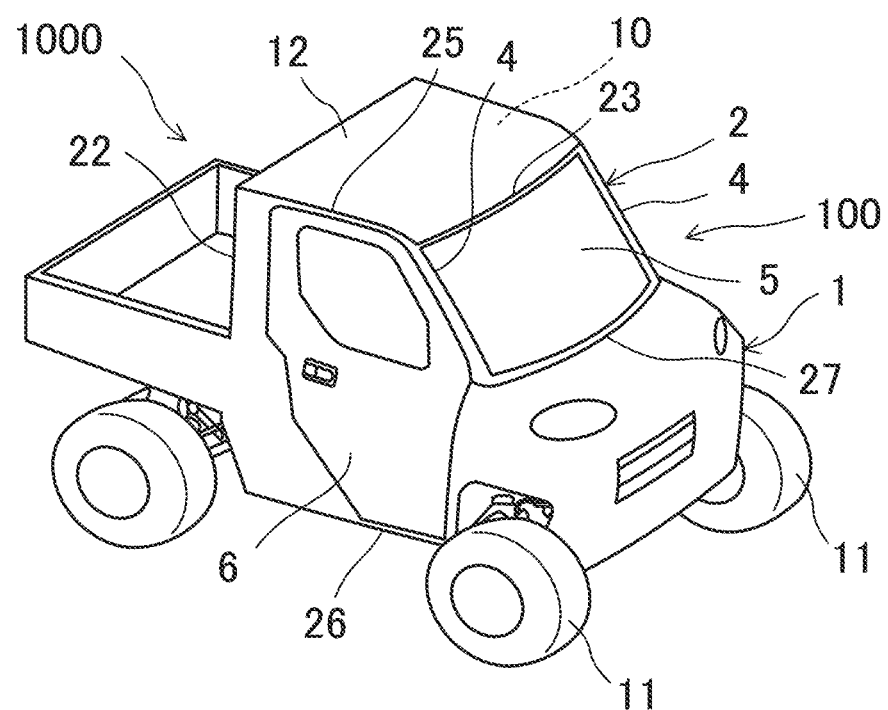
FIG. 1 is a perspective view of an of ad vehicle from a front right side.
Figure 2:
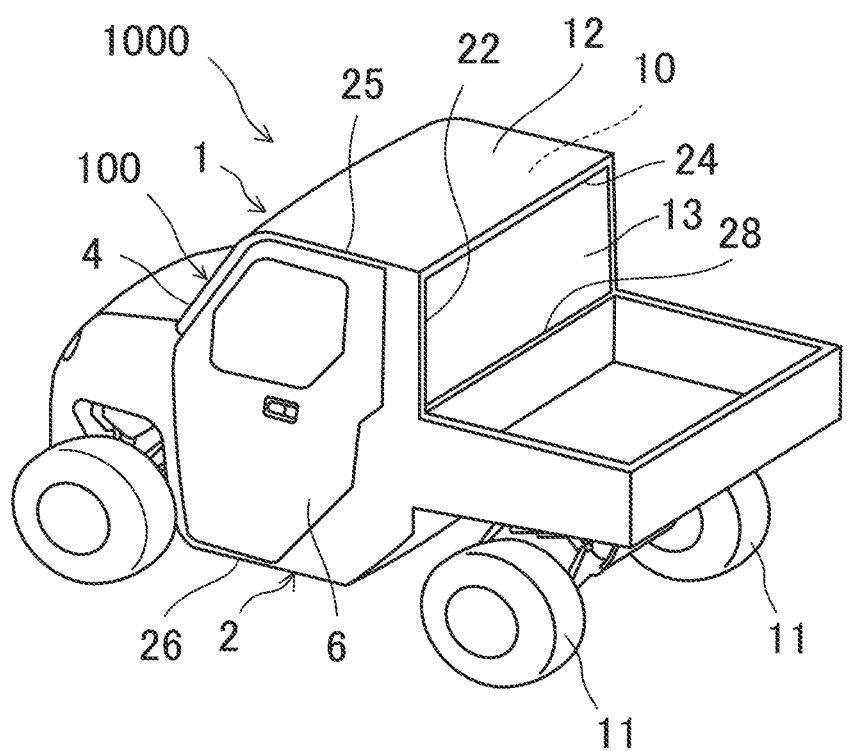
FIG. 2 is a perspective view of the off-road vehicle from a rear left side.

Hereinafter, an exemplary embodiment will be described in detail based on the drawings. FIG. 1 is a perspective view of a utility vehicle 1000 from a front right side. FIG. 2 is a perspective view of the utility vehicle 1000 from a rear left side. The utility vehicle 1000 can travel off road. The utility vehicle 1000 is one example of an off-road vehicle. Note that the off-road vehicle is not limited to the utility vehicle 1000 and may be, e.g., an all terrain vehicle (ATV) or a tractor. The utility vehicle 1000 includes a vehicle body 1 and a plurality of wheels 11.

Note that in the present disclosure, each configuration of the utility vehicle 1000 will be described using a direction when the utility vehicle 1000 is arranged on the horizontal plane. Specifically, a direction of forward movement of the utility vehicle 1000 is defined as forward, and a right-left direction when facing forward is defined as a right-left direction.

The vehicle body 1 is provided with a vehicle compartment 10. In this example, the vehicle compartment 10 forms a substantially-enclosed indoor space. The vehicle body 1 has a frame structure 2 forming a frame of the vehicle compartment 10, a roof panel 12 defining the upper side of the vehicle compartment 10, a front windowshield 5 defining the front of the vehicle compartment 10, a plurality of doors 6 defining the right and left sides of the vehicle compartment 10, and a rear windowshield 13 defining the rear of the vehicle compartment 10.

The frame structure 2 supports the roof panel 12, the front windowshield 5, the rear windowshield 13, etc. The frame structure 2 is substantially bilaterally symmetrical. The frame structure 2 has right and left front pillars 4, right and left rear pillars 22, a front header 23, a rear header 24, right and left roof side rails 25, right and left side sills 26, a dash panel 27, and a back panel 28.

The right and left front pillars 4 are positioned at a front end portion of the vehicle compartment 10. The right and left front pillars 4 are spaced from each other in the right-left direction. The right and left rear pillars 22 are positioned at a rear end portion of the vehicle compartment 10. The right and left rear pillars 22 are separated from each other in the right-left direction.

The front header 23 is positioned at the front end portion of the vehicle compartment 10. The front header 23 connects an upper end portion of the left front pillar 4 and an upper end portion of the right front pillar 4 to each other. The rear header 24 is positioned at the rear end portion of the vehicle compartment 10. The rear header 24 connects an upper end portion of the left rear pillar 22 and an upper end portion of the right rear pillar 22 to each other.

The left roof side rail 25 connects the upper end portion of the left front pillar 4 and the upper end portion of the left rear pillar 22 to each other. The right roof side rail 25 connects the upper end portion of the right front pillar 4 and the upper end portion of the right rear pillar 22 to each other. The left side sill 26 connects a lower end portion of the left front pillar 4 and a lower end portion of the left rear pillar 22 to each other. The right side sill 26 connects a lower end portion of the right front pillar 4 and a lower end portion of the right rear pillar 22 to each other.

The dash panel 27 connects a lower portion of the left front pillar 4 and a lower portion of the right front pillar 4 to each other. The back panel 28 connects a lower portion of the left rear pillar 22 and a lower portion of the right rear pillar 22.

The roof panel 12 is arranged above the front header 23, the right and left roof side rails 25, and the rear header 24. The roof panel 12 closes an opening defined by the front header 23, the right and left roof side rails 25, and the rear header 24.

The front windowshield 5 is arranged at the front of the front header 23, the right and left front pillars 4, and the dash panel 27. The front windowshield 5 closes an opening defined by the front header 23, the right and left front pillars 4, and the dash panel 27.

The rear windowshield 13 is arranged at the rear of the rear header 24, the right and left rear pillars 22, and the back panel 28. The rear windowshield 13 closes an opening defined by the rear header 24, the right and left rear pillars 22, and the back panel 28.

The door 6 is a swing door rotatable about a rotation axis substantially parallel with an up-down direction. The doors 6 open or close the vehicle compartment 10. Specifically, the left door 6 opens or closes an opening defined by the left roof side rail 25, the left front pillar 4, the left rear pillar 22, and the left side sill 26. The right door 6 opens or closes an opening defined by the right roof side rail 25, the right front pillar 4, the right rear pillar 22, and the right side sill 26.

Next, a windowshield attachment structure 100 will be described. The attachment structure 100 of this example is a structure for attaching the front windowshield 5 to the right and left front pillars 4. Specifically, the front windowshield 5 is attached to portions of the right and left front pillars 4 extending upward of the dash panel 27, i.e., portions called A-pillars. The front pillar 4 is one example of a pillar. The structure for attaching the front windowshield 5 to the left front pillar 4 and the structure for attaching the front windowshield 5 to the right front pillar 4 are bilaterally symmetrical to each other. Hereinafter, the structure for attaching the front windowshield 5 to the left front pillar 4 will be described, and the structure for attaching the front windowshield 5 to the right front pillar 4 will not be described.

Figure 3:
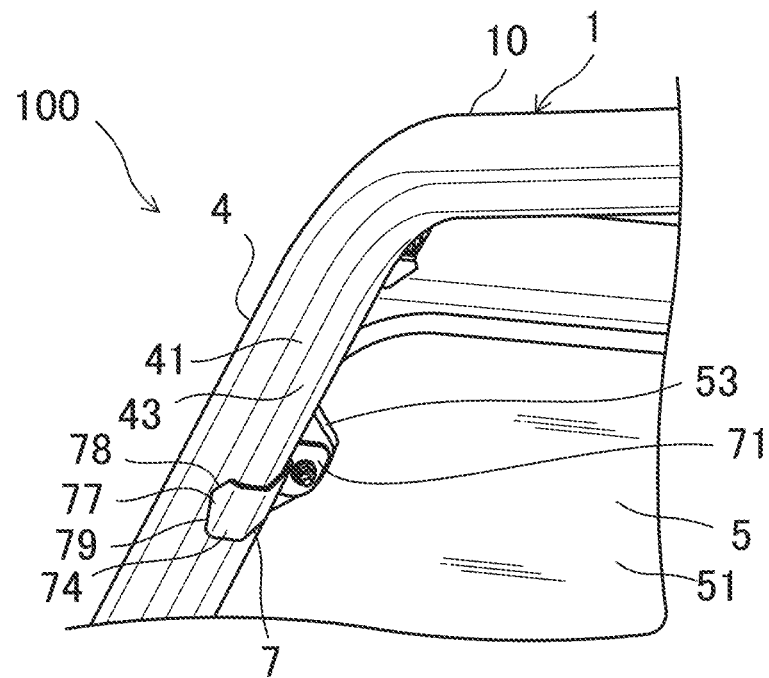
FIG. 3 is a perspective view showing a front windowshield attachment structure.
Figure 4:
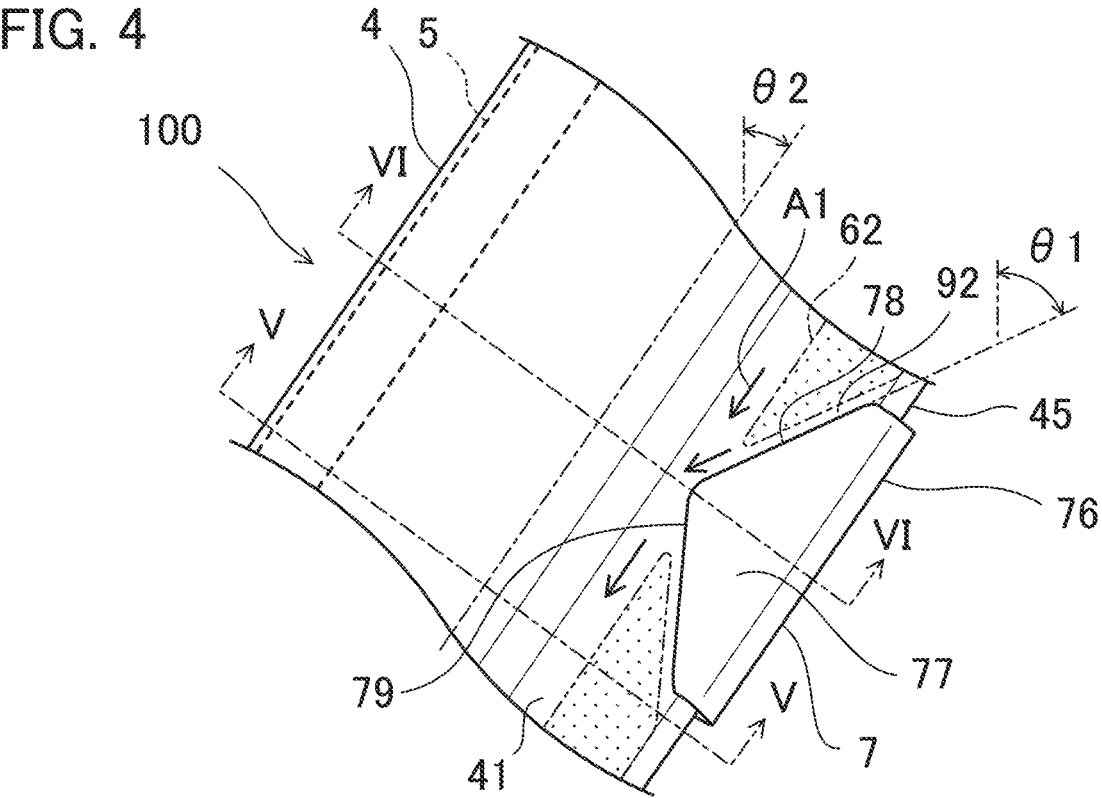
FIG. 4 is aside view showing the front windowshield attachment structure.
Figure 5:
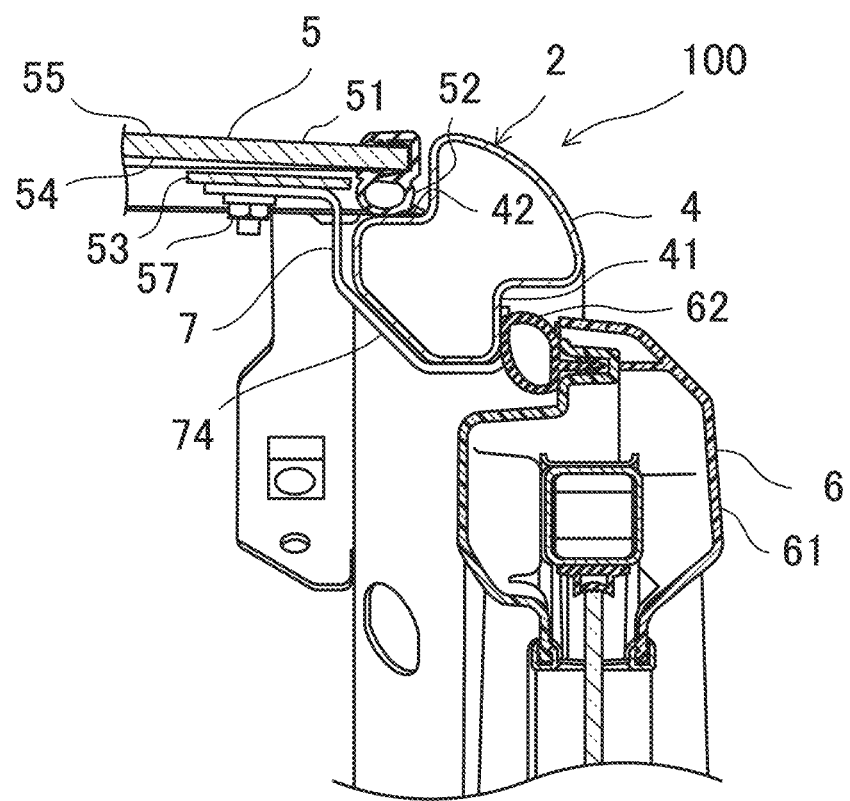
FIG. 5 is a sectional view along a V-V line of FIG. 4.

FIG. 3 is a perspective-view of the attachment structure 100. FIG. 4 is a side view of the attachment structure 100. FIG. 5 is a sectional view of the attachment structure 100 along a V-V line of FIG. 4. The attachment structure 100 includes the front windowshield 5, the front pillars 4, the doors 6, and brackets 7 attached to the front windowshield 5 and fixing the front windowshield 5 to the front pillars 4. The attachment structure 100 of this example includes two brackets 7 for fixing the front windowshield 5 to the single front pillar 4.

Figure 6:
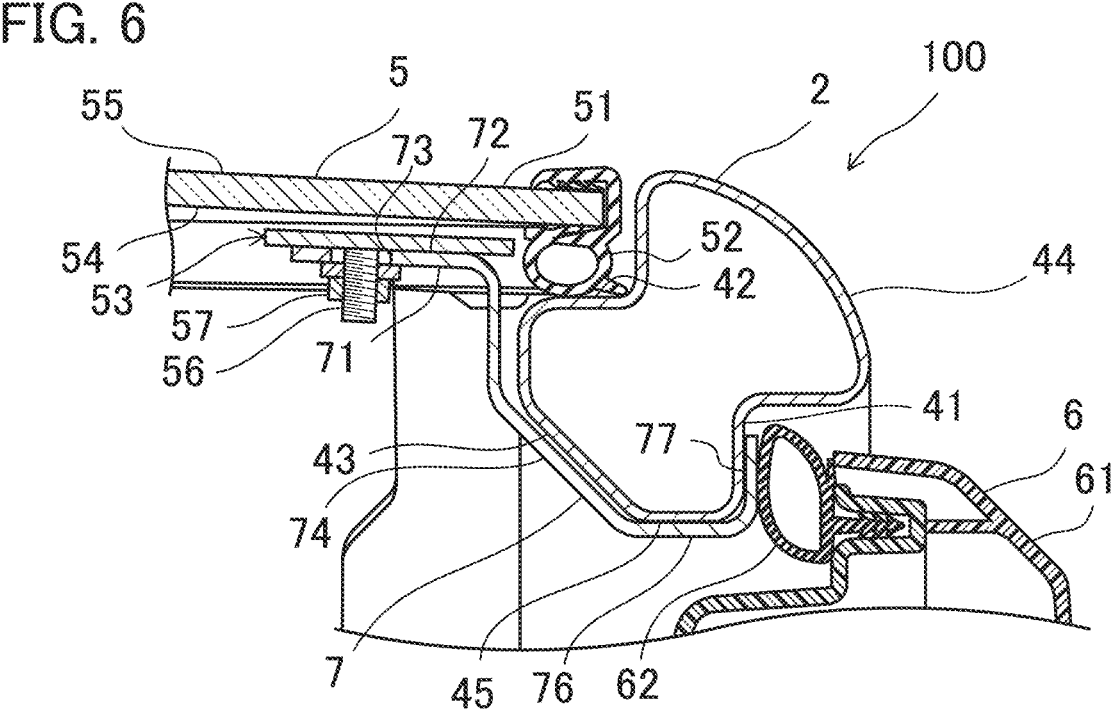
FIG. 6 is a sectional view along a VI-VI line of FIG. 4.

FIG. 6 is a sectional view of the attachment structure 100 along a VI-VI line of FIG. 4. Note that FIGS. 5 and 6 are different from each other in a scale. The front pillar 4 is, for example, made of metal. The front pillar 4 of this example is formed of a pipe. Specifically, the front pillar 4 is formed of a deformed pipe. Note that in the present disclosure, the "deformed pipe" means a pipe having a non-circular sectional shape. The front pillars 4 extend diagonally downward such that the vehicle compartment 10 has a wider front-rear length at a lower position. That is, the front pillar 4 extends diagonally downward toward the front.

The front pillar 4 has a first seal surface 41 contacting the door 6 and a second seal surface 42 contacting the front windowshield 5. In this example, the front pillar 4 further includes an inner connection surface 43 extending inside the vehicle compartment 10 and connecting the first seal surface 41 and the second seal surface 42 to each other and an outer connection surface 44 extending outside the vehicle compartment 10 and connecting the first seal surface 41 and the second seal surface 42 to each other. The inner connection surface 43 includes an opposing surface 45 positioned on the side opposite to the second seal surface 42. The opposing surface 45 is one example of a surface of the front pillar 4 on the side opposite to the front windowshield 5.

The first seal surface 41 is a surface facing outward of the vehicle compartment 10 in the right-left direction. The first seal surface 41 is one example of a seal surface. The first seal surface 41 is a flat surface. The second seal surface 42 is a surface facing the front windowshield 5. The second seal surface 42 is a flat surface.

The front windowshield 5 has a shield body 51, a first seal 52 sealing between the shield body 51 and each front pillar 4, and plates 53 attached to the shield body 51.

The shield body 51 is a substantially rectangular transparent plate. The shield body 51 is, for example, made of glass. The shield body 51 has an inner surface 54 facing inward of the vehicle compartment 10 and an outer surface 55 facing outward of the vehicle compartment 10.

The first seal 52 is formed in a substantially rectangular frame shape along a peripheral edge portion of the shield body 51. The first seal 52 is attached to the shield body 51. The first seal 52 is, for example, made of rubber or synthetic resin. The first seal 52 has elasticity. The first seal 52 is arranged between the shield body 51 and the second seal surface 42 of each front pillar 4. The front windowshield 5 contacts the second seal surfaces 42 through the first seal 52.

The plate 53 is a portion of the front windowshield 5 to which the brackets 7 are attached. The plate 53 is arranged along the inner surface 54 of the shield body 51. The plate 53 extends in a longitudinal direction of the front pillar 4. At the plate 53, two external screws 56 are provided with a space in the longitudinal direction of the front pillar 4. The external screw 56 protrudes to the side opposite to the shield body 51. The bracket 7 is attached to the external screw 56.

The door 6 contacts the first seal surface 41 in a closed state. The door 6 has a door body 61 and a second seal 62 sealing between the door body 61 and the front pillar 4 in the closed state of the door 6. The second seal 62 is one example of a seal.

The door body 61 is rotatably attached to the front pillar 4. The door body 61 rotates about a rotation axis substantially parallel with the up-down direction relative to the front pillar 4.

The second seal 62 is attached to a surface of the door body 61 facing inward of the vehicle compartment 10 in the closed state of the door 6. The second seal 62 is formed in a frame shape along a peripheral edge portion of the door body 61. The second seal 62 is, for example, made of rubber or synthetic resin. The second seal 62 has elasticity.

The second seal 62 contacts the first seal surface 41 in the closed state of the door 6, and is compressed by the door body 61 and the first seal surface 41. The second seal 62 seals between the door body 61 and the first seal surface 41. This prevents water from entering the vehicle compartment 10 through between the first seal surface 41 and the door body 61.

The bracket 7 is, for example, made of metal. The bracket 7 is formed of a metal plate. As shown in FIG. 6, the bracket 7 extends from the front windowshield 5 to the first seal surface 41 along the opposing surface 45 of the front pillar 4.

The bracket 7 has an attachment portion 71 attached to the front windowshield 5 and a holding portion 74 contacting the front pillar 4 to hold the front pillar 4. Specifically, the attachment portion 71 is attached to the plate 53. The holding portion 74 extends outward of the vehicle compartment 10 from the attachment portion 71 along the opposing surface 45 of the front pillar 4. The attachment portion 71 is attached to the plate 53 in a state in which the front pillar 4 is sandwiched by the front windowshield 5 and the holding portion 74. In this manner, the bracket 7 is attached to the front windowshield 5 in a state in which the bracket 7 holds the front pillar 4.

Figure 7:
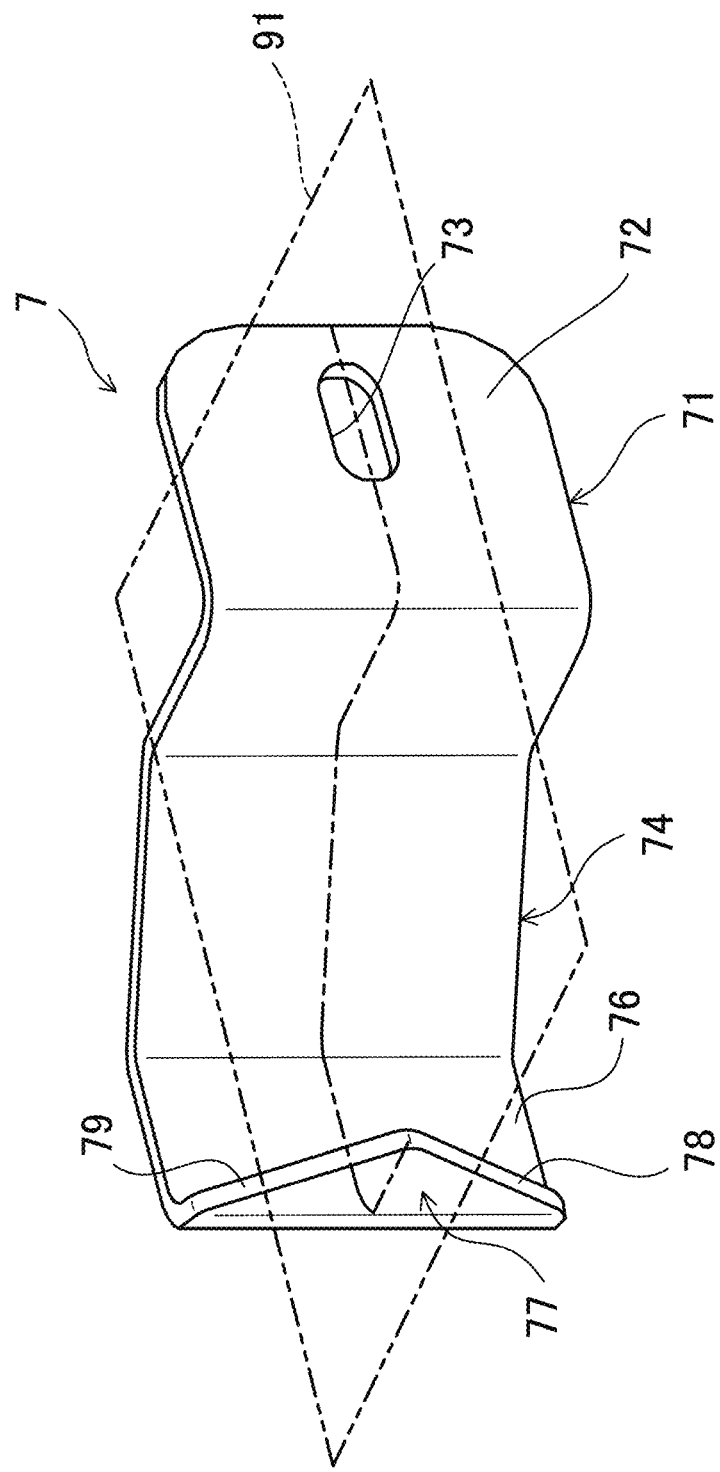
FIG. 7 is a perspective view of a bracket.

The bracket 7 will be described in more detail. FIG. 7 is a perspective view of the bracket 7. The attachment portion 71 has an attachment surface 72 facing the front windowshield 5. The holding portion 74 extends in a hook shape from the attachment portion 71. More specifically, the holding portion 74 extends in an in-plane direction of a virtual reference plane 91 perpendicular to the attachment surface 72. That is, the holding portion 74 extends parallel with the reference plane 91.

The holding portion 74 has a shape symmetrical with respect to the reference plane 91. In this example, the attachment portion 71 also has a shape symmetrical with respect to the reference plane 91. That is, the entirety of the bracket 7 has a shape symmetrical with respect to the reference plane 91. Thus, a common bracket can be used as the bracket 7 for attaching the front windowshield 5 to the left front pillar 4 and the bracket 7 for attaching the front windowshield 5 to the right front pillar 4. That is, the front windowshield 5 can be attached, to both right and left front pillars 4 with a single type of bracket 7.

Figure 8:
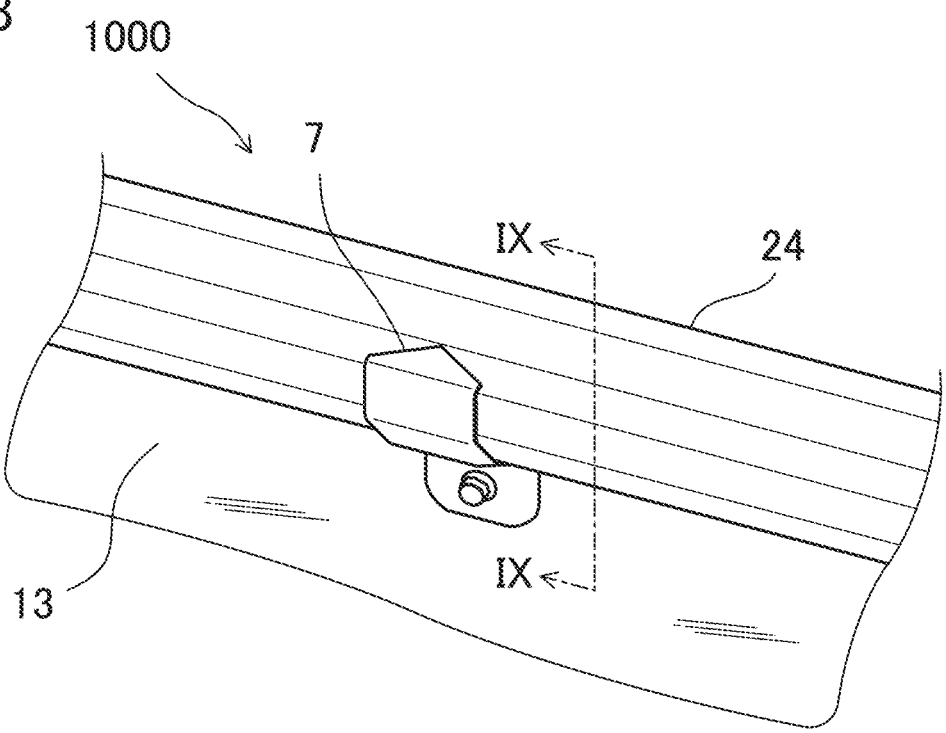
FIG. 8 is a perspective view showing a rear windowshield attachment structure.
Figure 9:
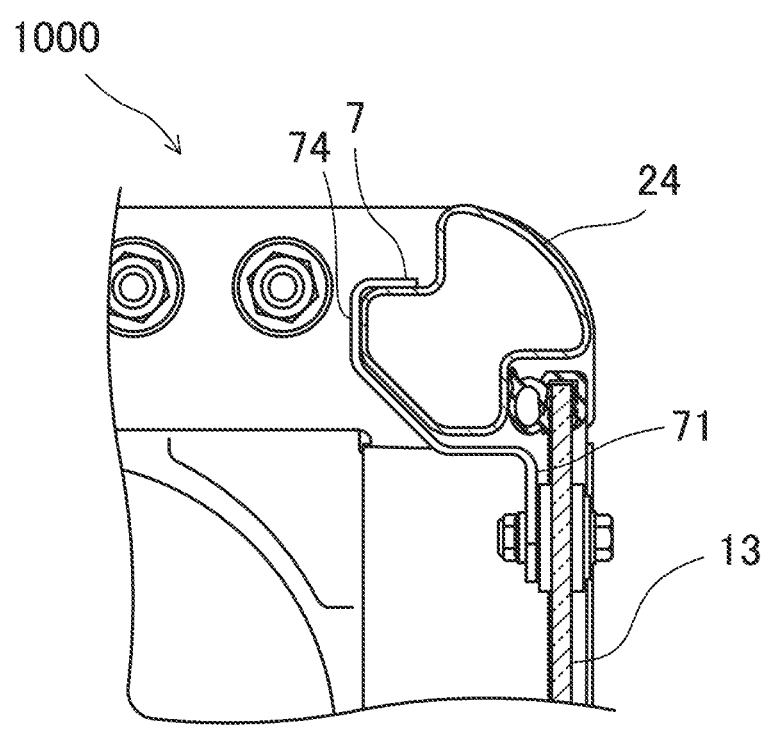
FIG. 9 is a sectional view along an IX-TX line of FIG. 8.

Further, the holding portion 74 can hold not only the front pillar 4, but also other frames having the same sectional shape as that of the front pillar 4. These other frames may include a cross member extending in the right-left direction, such as the front header 23 or the rear header 24. Thus, as shown in, e.g., FIGS. 8 and 9, the bracket 7 can also be utilized for attachment of the rear windowshield 13 to the rear header 24. In this case, the holding portion 74 holds the rear header 24, and the attachment portion 71 is attached to the rear windowshield 13 as in the case of attaching the front windowshield 5. Further, in a case where the front header 23 has the same sectional shape as that of the front pillar 4, the bracket 7 can also be utilized for attachment of the front windowshield 5 to the front header 23.

The attachment portion 71 is detachably attached to the plate 53 of the front windowshield 5 with the screw. Specifically, as shown in FIG. 7, a long hole 73 penetrating the attachment portion 71 in a direction perpendicular to the attachment surface 72 is formed at the attachment portion 71. The external screw 56 for attaching the attachment portion 71 to the plate 53 penetrates the long hole 73. The long hole 73 extends parallel with the reference plane 91.

The holding portion 74 is bent or curved corresponding to the sectional shape of the front pillar 4, and as a whole, is formed in the hook shape. The holding portion 74 includes a tip end portion 77 arranged on the first seal surface 41. The tip end portion 77 is one example of a tip end portion of the bracket 7. The holding portion 74 further includes a contact portion 76 contacting the opposing surface 45 of the front pillar 4.

The tip end portion 77 protrudes from the contact portion 76. The tip end portion 77 has a first edge 78 and a second edge 79 symmetrical to each other with respect to the reference plane 91. In this example, the tip end portion 77 is formed substantially in an isosceles triangular shape. The first edge 78 and the second edge 79 each correspond to the equal sides of the isosceles triangle. A portion of the tip end portion 77 connected to the contact portion 76 corresponds to the base of the isosceles triangle. Note that the tip end portion 77 may be formed substantially in an isosceles trapezoidal shape. In this case, the first edge 78 and the second edge 79 each correspond to the legs of the trapezoid. The portion of the tip end portion 77 connected to the contact portion 76 corresponds to a lower base.

Subsequently, the method for attaching the front windowshield 5 with the brackets 7 will be described. First, an operator pushes the front windowshield 5 against the right and left front pillars 4 from the outside of the vehicle compartment 10, i.e., the substantially front. Next, the operator attaches the brackets 7 to the front windowshield 5 in a state in which each front pillar 4 is sandwiched by the front windowshield 5 and the brackets 7. The brackets 7 are attached to the front windowshield 5 at two upper and lower portions at each of the right and left front pillars 4. In this manner, the front windowshield 5 is fixed to the right and left front pillars 4.

The bracket 7 will be described in more detail. The attachment portion 71 is arranged on the plate 53 such that the attachment surface 72 of the bracket 7 contacts the plate 53 and the external screw 56 penetrates the long hole 73. At this point, the bracket 7 is arranged such that the attachment portion 71 is positioned inward of the vehicle compartment 10 with respect to the holding portion 74 in the right-left direction. That is, the bracket 7 is arranged in a state in which the holding portion 74 extends outward of the vehicle compartment 10 from the attachment portion 71. Since the attachment portion 71 is arranged on the plate 53 as described above, the front pillar 4 is arranged between the holding portion 74 and the front windowshield 5.

A direction in which the long hole 73 extends is the right-left direction. The position of the bracket 7 in the right-left direction is adjusted within the area of the long hole 73 such that the tip end portion 77 contacts the first seal surface 41. In a state in which the tip end portion 77 contacts the first seal surface 41, a nut 57 is screwed onto the external screw 56.

As screwing of the nut 57 progresses, the contact portion 76 comes into contact with the opposing surface 45. By contact between the contact portion 76 and the opposing surface 45, the first seal 52 is compressed by the shield body 51 and the second seal surface 42, and seals between the shield body 51 and the second seal surface 42. Moreover, by contact between the contact portion 76 and the opposing surface 45, movement of the front windowshield 5 substantially in the front-rear direction is restricted. Further, by contact between the tip end portion 77 and the first seal surface 41, movement of the front windowshield 5 in the right-left direction is restricted. Since at least the contact portion 76 and the tip end portion 77 contact the front pillar 4 as described above, the holding portion 74 holds the front pillar 4. Thus, at the same time as attachment of the brackets 7 to the front windowshield 5, the brackets 7 fix the front windowshield 5 to the front pillars 4.

In a state in which the bracket 7 is attached to the front windowshield 5, the bracket 7 extends from the plate 53 to the first seal surface 41 along the inner connection surface 43 of the front pillar 4. The tip end portion 77 is arranged on the first seal surface 41.

An upper edge of the tip end portion 77 is inclined with respect to the horizontal direction so as to be positioned downward toward the front windowshield 5. That is, one, which is positioned on the upper side in a state in which the bracket 7 is attached to the front windowshield 5, of the first edge 78 or the second edge 79 is inclined with respect to the horizontal direction so as to be positioned downward toward the front windowshield 5. In a case where the bracket 7 holds the left front pillar 4 as shown in FIG. 4, the first edge 78 is the upper edge of the tip end portion 77. On the other hand, in a case where the bracket 7 holds the right front pillar 4, the second edge 79 is the upper edge of the tip end portion 77.

As shown in FIG. 4, the first edge 78 for the left front pillar 4 is inclined with respect to the horizontal direction so as to be positioned downward toward the front windowshield 5. That is, the first edge 78 extends diagonally downward toward the front. In other words, the first edge 78 is inclined so as to be positioned downward as extending away from the opposing surface 45 of the front pillar 4, i.e., extending outward of the vehicle compartment 10.

More specifically, the inclination angle θ1 of the first edge 78 with respect to the vertical direction is greater than the inclination angle θ2 of the front pillar 4 with respect to the vertical direction. In the present disclosure, the inclination angle θ1 is a narrow angle between a direction in which the first edge 78 extends and the vertical direction. The inclination angle θ2 is a narrow angle between a length direction of the front pillar 4 and the vertical direction.

Note that the second edge 79 is the upper edge of the tip end portion 77 in the case of the right front pillar 4, and therefore, the first edge 78 in description regarding the left front pillar 4 is replaced with the second edge 79.

Since the second seal 62 contacts the first seal surface 41 in the closed state of the door 6, the second seal 62 also contacts the tip end portion 77 as shown in FIG. 6. Since the tip end portion 77 has a thickness, the tip end portion 77 and the first seal surface 41 form a step along an outer peripheral edge of the tip end portion 77. Dotted portions in FIG. 4 are portions of the first seal surface 41 contacting the second seal 62. That is, at the outer periphery of the tip end portion 77, a clearance 92 may be formed between the first seal surface 41 and the second seal 62. The clearance 92 may be formed along the upper edge of the tip end portion 77.

There is a probability that water such as rainwater or washing water flows down along an exposed portion of the second seal 62 as indicated by arrows A1 of FIG. 4. Since the front pillar 4 extends diagonally downward toward the front, the second seal 62 also extends diagonally downward toward the front. That is, the water flows diagonally downward toward the front along the second seal 62. There is a probability that the water flowing down in this manner enters the clearance 92 adjacent to the first edge 78 as the upper edge of the tip end portion 77. Particularly, in a case where part of the tip end portion 77 is exposed to the outside from the second seal 62, the flow of water flowing down along the second seal 62 is weakened by the exposed portion of the tip end portion 77, and the probability of the water entering the clearance 92 adjacent to the first edge 78 increases.

However, the first edge 78 is inclined so as to be positioned downward toward the front windowshield 5. Thus, the water cannot enter the clearance 92 adjacent to the first edge 78 as long as the water flows upward. Even if the water enters the clearance 92, such water is eventually guided to the front windowshield 5 along the first edge 78. The phrase "toward the front windowshield 5" indicates a direction to the outside of the vehicle compartment 10, i.e., a direction apart from the opposing surface 45 of the front pillar 4. That is, the water is guided outward of the vehicle compartment 10. The water guided along the first edge 78 joins the water flowing diagonally downward along the second seal 62, and then, flows down along the second seal 62. Thus, entrance of the water into the vehicle compartment 10 through the clearance 92 is reduced.

Since the inclination angle θ1 of the first edge 78 with respect to the vertical direction is greater than the inclination angle θ2 of the pillar with respect to the vertical direction, the dimension of the tip end portion 77 in the direction apart from the opposing surface 45 can be increased. With the increased dimension of the tip end portion 77 in this direction, the area of the tip end portion 77 can be expanded, and the force of holding the front pillar 4 by the bracket 7 can be increased.

The front windowshield 5 attached to the front pillars 4 can be detached from the vehicle body 1 in such a manner that the brackets 7 are detached from the front windowshield 5. Specifically, the nuts 57 screwed onto the external screws 56 of the front windowshield 5 are detached so that the attachment portions 71 can be detached from the plates 53. Thereafter, the attachment portions 71 are detached from the plates 53, and accordingly, the front windowshield 5 is detached from the front pillars 4.

With the attachment structure 100 having the above-described configuration, it is not necessary to wait until an adhesive is cured while holding the front windowshield 5, as in the case of attaching the front windowshield 5 to the front pillars 4 with the adhesive. Thus, the front windowshield 5 is easily attached to the front pillars 4. Moreover, in a state in which the front windowshield 5 is attached to the front pillars 4, each front pillar 4 is sandwiched by the front windowshield 5 and the brackets 7, and movement of the front windowshield 5 in the front-rear direction is restricted. Further, the tip end portion 77 of each bracket 7 is stopped on the first seal surface 41, and therefore, movement of the front windowshield 5 in the right-left direction is restricted. Thus, the front windowshield 5 can be firmly attached to the front pillars 4 with the brackets 7.

In addition, the front pillar 4 is formed of the deformed pipe having excellent stiffness. Thus, a situation where the tip end portion 77 stopped on the first seal surface 41 is disengaged due to deformation of the front pillar 4 is less likely to occur. Further, in a case where the front pillar 4 is a circular pipe, if there is a shape error in the front pillar 4 or the bracket 7, the front pillar 4 and the bracket 7 may be in line contact with each other. On the other hand, in a case where the front pillar 4 is the deformed pipe, a configuration in which the front pillar 4 and the bracket 7 contact each other at a plurality of portions such as the first seal surface 41 and the opposing surface 45 is easily achieved. Since the front pillar 4 and the bracket 7 contact each other at the plurality of portions, firm engagement between the front pillar 4 and the bracket 7 is easily maintained even if there is the shape error in the front pillar 4 or the bracket 7. Thus, the front windowshield 5 can be more firmly attached to the front pillars 4.

As described above, the windowshield attachment structure 100 includes the front windowshield 5 (a windowshield) defining the front of the vehicle compartment 10 of the utility vehicle 1000 (an off-road vehicle), the front pillars 4 (a pillar) arranged inward of the vehicle compartment 10 with respect to the front windowshield 5 in the front-rear direction of the utility vehicle 1000, the doors 6 defining the sides of the vehicle compartment 10 and opening or closing the vehicle compartment 10, and the brackets 7 attached to the front windowshield 5 and fixing the front windowshield 5 to the front pillars 4. The front pillar 4 has the first seal surface 41 (a seal surface) facing outward of the vehicle compartment 10. The door 6 has the second seal 62 (a seal) contacting the first seal surface 41 in the closed state. The bracket 7 extends from the front windowshield 5 to the first seal surface 41 along the opposing surface 45 of the front pillar 4 (a surface of the front pillar 4 on the side opposite to the front windowshield 5). The tip end portion 77 of the bracket 7 is arranged on the first seal surface 41. The first edge 78 (an upper edge) of the tip end portion 77 is inclined with respect to the horizontal direction so as to be positioned downward toward the front windowshield 5.

In other words, the bracket 7 is the bracket 7 for attaching the front windowshield 5 (a windowshield) defining the front of the vehicle compartment 10 of the utility vehicle 1000 (an off-rod vehicle) to the front pillars 4 (a pillar) arranged inward of the vehicle compartment 10 with respect to the front windowshield 5 in the front-rear direction of the utility vehicle 1000. The bracket 7 includes the attachment portion 71 attached to the front windowshield 5 and the holding portion 74 extending in the hook shape from the attachment portion 71 along the opposing surface 45 of the front pillar 4. The holding portion 74 includes the tip end portion 77 arranged on the surface of the front pillar 4 facing outward of the vehicle compartment 10. The first edge 78 (an upper edge) of the tip end portion 77 is inclined with respect to the horizontal direction so as to be positioned downward toward the outside of the vehicle compartment 10.

According to these configurations, the brackets 7 are attached to the front windowshield 5 in a state in which the brackets 7 are positioned along the opposing surfaces 45 of the front pillars 4, and therefore, the front windowshield 5 can be attached to the front pillars 4. In this case, it is not necessary to wait until the adhesive is cured while holding the front windowshield 5 not to move relative to the front pillars 4, as in the case of attaching the front windowshield 5 to the front pillars 4 with the adhesive. Thus, the front windowshield 5 is easily attached to the front pillars 4. Moreover, in a state in which the front windowshield 5 is attached to the front pillars 4, each front pillar 4 is sandwiched by the brackets 7 positioned along the opposing surface 45 of the front pillar 4 and the front windowshield 5, and movement of the front windowshield 5 substantially in the front-rear direction is restricted. Further, the tip end portions 77 of the brackets 7 are stopped by contacting the first seal surfaces 41, and therefore, movement of the front windowshield 5 in the right-left direction is restricted. Thus, the front windowshield 5 can be firmly attached to the front pillars 4 with the brackets 7.

The first edge 78 of the tip end portion 77 is inclined with respect to the horizontal direction so as to be positioned downward toward the front windowshield 5. Thus, even if the clearance 92 is formed between the second seal 62 and the first seal surface 41 around the tip end portion 77 due to contact of the second seal 62 of the door 6 in the closed state with the tip end portion 77, water having entered the clearance 92 is guided outward of the vehicle compartment 10 along the first edge 78. Thus, entrance of the water into the vehicle compartment 10 through the clearance 92 is reduced.

The bracket 7 has the attachment portion 71 attached to the front windowshield 5 and the holding portion 74 contacting the front pillar 4 to hold the front pillar 4, and the tip end portion 77 is part of the holding portion 74.

According to this configuration, the attachment portions 71 are attached to the front windowshield 5 in a state in which the holding portions 74 hold the front pillars 4, and therefore, the front windowshield 5 can be attached to the front pillars 4.

The attachment portion 71 is detachably attached to the front windowshield 5. According to this configuration, the front windowshield 5 can be detached from the front pillars 4 in such a manner that the brackets 7 are detached from the front windowshield 5. Thus, according to, e.g., intended use of the utility vehicle 1000, the utility vehicle 1000 can be changed between a state in which the front windowshield 5 is attached to the vehicle body 1 and a state in which the front windowshield 5 is detached from the vehicle body 1.

The holding portion 74 can hold the rear header 24 (a cross member) arranged at the end portion of the vehicle compartment in the front-rear direction.

According to this configuration, the attachment portions 71 are attached to the rear windowshield 13 in a state in which the holding portions 74 hold the rear header 24, and therefore, the rear windowshield 13 can be fixed to the rear header 24 with the brackets 7.

The front windowshield 5 defines the front of the vehicle compartment 10. The front pillar 4 extends diagonally downward toward the front. The first edge 78 of the tip end portion 77 extends diagonally downward toward the front. The inclination angle θ1 of the first edge 78 with respect to the vertical direction is greater than the inclination angle θ2 of the front pillar 4 with respect to the vertical direction.

According to this configuration, the front windowshield 5 can be easily and firmly attached to the front pillars 4 with the brackets 7. Moreover, since the inclination angle θ1 is greater than the inclination angle θ2, the dimension of the tip end portion 77 in the direction toward the front windowshield 5 can be increased. With the increased dimension of the tip end portion 77 in this direction, the area of the tip end portion 77 can be expanded and the force of holding the front pillars 4 by the brackets 7 can be increased.

The front pillar 4 is formed of the deformed pipe, and the first seal surface 41 is the flat surface facing outward of the vehicle compartment 10.

According to this configuration, the front pillar 4 is formed of the deformed pipe, and therefore, the stiffness of the front pillar 4 can be increased. Thus, the situation where the tip end portion 77 stopped on the first seal surface 41 is disengaged due to deformation of the front pillar 4 is less likely to occur. Further, even if there is the shape error in the front pillar 4 or the bracket 7, the front pillar 4 and the bracket 7 can contact each other at the plurality of portions such as the first seal surface 41 and the opposing surface 45. Thus, firm engagement between the front pillar 4 and the bracket 7 can be easily maintained, and the front windowshield 5 can be more firmly attached to the front pillars 4.

The attachment portion 71 has the attachment surface 72 facing the front windowshield 5, and the holding portion 74 extends in the in-plane direction of the virtual reference plane 91 perpendicular to the attachment surface 72 and has the shape symmetrical with respect to the reference plane 91.

According to this configuration, the holding portion 74 has the shape symmetrical with respect to the reference plane 91, and therefore, the common bracket can be used as the bracket 7 for attaching the front windowshield 5 to the left front pillar 4 and the bracket 7 for attaching the front windowshield 5 to the right front pillar 4. That is, the front windowshield 5 can be attached to both right and left front pillars 4 with the single type of bracket 7.

The windowshield attachment structure 100 includes the front windowshield 5 (a windowshield) defining the front of the vehicle compartment 10 of the utility vehicle 1000 (an off-road vehicle), the front pillars 4 (a pillar) arranged inward of the vehicle compartment 10 with respect to the front windowshield 5 in the front-rear direction of the utility vehicle 1000, the doors 6 defining the sides of the vehicle compartment 10 and opening or closing the vehicle compartment 10, and the brackets 7 attached to the front windowshield 5 and fixing the front windowshield 5 to the front pillars 4. The front pillar 4 has the first seal surface 41 (a seal surface) facing outward of the vehicle compartment 10. The door 6 has the second seal 62 (a seal) contacting the first seal surface 41 in the closed state. The bracket 7 extends from the front windowshield 5 to the first seal surface 41 along the opposing surface 45 of the front pillar 4. The tip end portion 77 of the bracket 7 is arranged on the first seal surface 41. The front pillar 4 is formed of the deformed pipe.

According to this configuration, it is not necessary to wait until the adhesive is cured while holding the front windowshield 5, as in the case of attaching the front windowshield 5 to the front pillars 4 with the adhesive. Thus, the front windowshield 5 is easily attached to the front pillars 4. Moreover, in a state in which the front windowshield 5 is attached to the front pillars 4, each front pillar 4 is sandwiched by the brackets 7 positioned along the opposing surface 45 of the front pillar 4 and the front windowshield 5, and movement of the front windowshield 5 in the front-rear direction is restricted. Further, the tip end portions 77 of the brackets 7 contact the first seal surfaces 41, and therefore, movement of the front windowshield 5 in the right-left direction is restricted. Thus, the front windowshield 5 can be firmly attached to the front pillars 4 with the brackets 7. In addition, the front pillar 4 is formed of the deformed pipe, and therefore, the stiffness of the front pillar 4 can be increased. Thus, the situation where the tip end portion 77 stopped on the first seal surface 41 is disengaged due to deformation of the front pillar 4 is less likely to occur.

Figure 10:
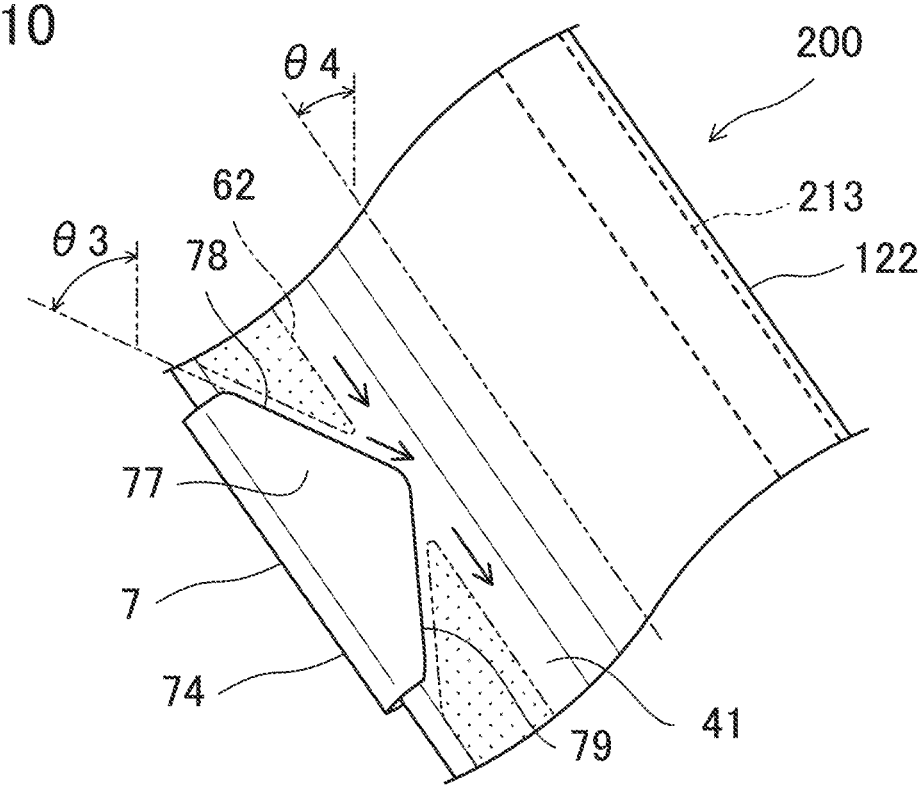
FIG. 10 is a side view of an attachment structure of a variation.

Next, a windowshield attachment structure of a variation will be described. FIG. 10 shows the windowshield attachment structure 200 of the variation. The windowshield attachment structure 200 of this example is different from the attachment structure 100 in that a rear windowshield 213 is attached to rear pillars 122 with brackets 7. The rear windowshield 213 is one example of a windowshield. The rear pillar 122 is one example of a pillar. Note that the attachment structure 200 is symmetrical to the attachment structure 100 in the front-rear direction.

The windowshield attachment structure 200 includes the rear windowshield 213 (a windowshield) defining the rear of a vehicle compartment of a utility vehicle (an off-road vehicle), the rear pillars 122 (pillars) arranged inward of the vehicle compartment with respect to the rear windowshield 213 in a front-rear direction of the utility vehicle, doors defining the sides of the vehicle compartment and opening or closing the vehicle compartment, and the brackets 7 attached to the rear windowshield 213 and fixing the rear windowshield 213 to the rear pillars 122. The rear pillar 122 has a seal surface 41 facing outward of the vehicle compartment, the door has a second seal 62 (a seal) contacting the first seal surface 41 (a seal surface) in a closed state, the bracket 7 extends from the rear windowshield 213 to the first seal surface 41 along a surface of the rear pillar 122 on the side opposite to the rear windowshield 213, a tip end portion 77 of the bracket 7 is arranged on the first seal surface 41, and a first edge 78 (an upper edge) of the tip end portion 77 is inclined with respect to the horizontal direction so as to be positioned downward toward the rear windowshield 213. The rear windowshield 213 defines the rear of the vehicle compartment, the rear pillar 122 extends diagonally downward toward the rear, the first edge 78 of the tip end portion 77 extends diagonally downward toward the rear, and the inclination angle θ3 of the first edge 78 with respect to the vertical direction is greater than the inclination angle θ4 of the rear pillar 122 with respect to the vertical direction.

According to this configuration, the rear windowshield 213 can be easily and firmly attached to the rear pillars 122 with the brackets 7.

Moreover, since the inclination angle θ3 is greater than the inclination angle θ4, the dimension of the tip end portion 77 in a direction toward the rear windowshield 213 can be increased. With the increased dimension of the tip end portion 77 in this direction, the area of the tip end portion 77 can be expanded and the force of holding the rear pillars 122 by the brackets 7 can be increased.

Other Embodiments

The embodiment has been described above as an example of the technique disclosed in the present application. However, the technique in the present disclosure is not limited to above, and is also applicable to embodiments to which changes, replacements, additions, omissions, etc. are made as necessary. The components described above in the embodiment may be combined to form a new embodiment. The components shown in the attached drawings and described in detail may include not only components essential for solving the problems, but also components that are provided for describing an example of the above-described technique and are not essential for solving the problems. Thus, description of these non-essential components in detail and illustration of these components in the attached drawings shall not be interpreted that these non-essential components are essential.

The front pillar 4 may be made of a material other than metal. The front pillar 4 may be a solid member. The length direction of the front pillar 4 is not limited. The length direction of the front pillar 4 may be substantially parallel with the vertical direction, and the inclination angle θ1 of the length direction of the front pillar 4 with respect to the vertical direction is not limited. The sectional shape of the front pillar 4 is not limited. The sectional shape of the front pillar 4 may be, for example, a circular shape. The first seal surface 41 is not limited to the flat surface. The first seal surface 41 may be, for example, a curved surface. Note that the same also applies to the rear pillar 122 in the attachment structure 200.

The material and shape of the bracket 7 are not limited. For example, the bracket 7 may be formed in an asymmetrical shape. The fixing tool may be a screw to be screwed into a screw hole, which is formed at the plate 53, through the long hole 73. The bracket 7 may be fixed to the plate 53 by a method other than screwing. The bracket 7 may be detachably attached to the front windowshield 5 with a screw other than the external screw 56 and the nut 57. For example, the bracket 7 may be attached to the front windowshield 5 by means of the screw screwed into the screw hole, which is formed at the plate 53, through the long hole 73. The bracket 7 may be detachably attached to the front windowshield 5 by a fastening tool, such as a clamp, other than a screw, fitting, or stopping.

The door 6 rotates about the front end portion of the door 6, but may rotate about a rear end portion of the door 6.

The shape of the bracket 7 is not limited. The shape of the tip end portion 77 may be a triangular shape other than the isosceles triangle. A length direction of the first edge 78 is not limited. The first edge 78 may be inclined with respect to the horizontal direction so as to be positioned upward toward the front windowshield 5. The first edge 78 may be parallel with the horizontal direction. Only the holding portion 74 of the bracket 7 may be in the shape symmetrical with respect to the reference plane 91. The holding portion 74 may be in a shape other than the shape symmetrical with respect to the reference plane 91.

What is claimed:

1. A windowshield attachment structure comprising:
a windowshield defining a front or rear of a vehicle compartment of an off-road vehicle;
a pillar arranged inward of the vehicle compartment with respect to the windowshield in a front-rear direction of the off-road vehicle;
a door defining a side of the vehicle compartment and opening or closing the vehicle compartment; and
a bracket attached to the windowshield and fixing the windowshield to the pillar,
wherein the pillar has a seal surface facing outward of the vehicle compartment,
the door has a seal contacting the seal surface in a closed state,
the bracket extends from the windowshield to the seal surface along a surface of the pillar on a side opposite to the windowshield,
a tip end portion of the bracket is arranged on the seal surface, and
an upper edge of the tip end portion is inclined with respect to a horizontal direction so as to be positioned downward toward the windowshield.

2. The windowshield attachment structure of claim 1, wherein
the bracket has an attachment portion attached to the windowshield and a holding portion contacting the pillar to hold the pillar, and
the tip end portion is part of the holding portion.

3. The windowshield attachment structure of claim 2, wherein
the attachment portion is detachably attached to the windowshield.

4. The windowshield attachment structure of claim 2, wherein
the holding portion is able to hold a cross member arranged at an end portion of the vehicle compartment in the front-rear direction.

5. The windowshield attachment structure of claim 1, wherein
the windowshield defines the front of the vehicle compartment,
the pillar extends diagonally downward toward the front,
the upper edge of the tip end portion extends diagonally downward toward the front, and
an inclination angle of the upper edge with respect to a vertical direction is greater than an inclination angle of the pillar with respect to the vertical direction.

6. The windowshield attachment structure of claim 1, wherein
the windowshield defines the rear of the vehicle compartment,
the pillar extends diagonally downward toward the rear,
the upper edge of the tip end portion extends diagonally downward toward the rear, and
an inclination angle of the upper edge with respect to a vertical direction is greater than an inclination angle of the pillar with respect to the vertical direction.

7. The windowshield attachment structure of claim 1, wherein
the pillar is formed of a deformed pipe, and
the seal surface is a flat surface facing outward of the vehicle compartment.

8. A bracket for attaching a windowshield defining a front or rear of a vehicle compartment of an off-rod vehicle to a pillar arranged inward of the vehicle compartment with respect to the windowshield in a front-rear direction of the off-road vehicle, comprising:
an attachment portion attached to the windowshield; and
a holding portion extending in a hook shape from the attachment portion along a surface of the pillar on a side opposite to the windowshield,
wherein the holding portion includes a tip end portion arranged on a surface of the pillar facing outward of the vehicle compartment, and
an upper edge of the tip end portion in a state in which the holding portion holds the pillar is inclined with respect to a horizontal direction so as to be positioned downward toward an outside of the vehicle compartment.

9. The bracket of claim 8, wherein
the attachment portion has an attachment surface facing the windowshield, and
the holding portion extends in an in-plane direction of a virtual reference plane perpendicular to the attachment surface, and has a shape symmetrical with respect to the reference plane.

10. A windowshield attachment structure comprising:
a windowshield defining a front or rear of a vehicle compartment of an off-road vehicle;
a pillar arranged inward of the vehicle compartment with respect to the windowshield in a front-rear direction of the off-road vehicle;
a door defining a side of the vehicle compartment and opening or closing the vehicle compartment; and
a bracket attached to the windowshield and fixing the windowshield to the pillar,
wherein the pillar has a seal surface facing outward of the vehicle compartment, the door has a seal contacting the seal surface in a closed state, the bracket extends from the windowshield to the seal surface along a surface of the pillar on a side opposite to the windowshield, a tip end portion of the bracket is arranged on the seal surface, and the pillar is formed of a deformed pipe.

\* \* \* \* \*